United States Patent [19]

Toshimichi

[11] Patent Number: 4,612,442
[45] Date of Patent: Sep. 16, 1986

[54] PASSIVE INFRARED INTRUSION DETECTION SYSTEM

[75] Inventor: Yasujima Toshimichi, Tokyo, Japan

[73] Assignee: King Tsushin Kogyo Kabushiki Kaisha, Tokyo, Japan

[21] Appl. No.: 617,789

[22] Filed: Jun. 6, 1984

[30] Foreign Application Priority Data

Jun. 10, 1983 [JP] Japan .................... 58-103906

[51] Int. Cl.$^4$ .................................... G08B 13/18
[52] U.S. Cl. .............................. 250/353; 250/342; 250/349; 340/567
[58] Field of Search ............ 340/565, 567; 250/340, 250/342, 353, 349

[56] References Cited

U.S. PATENT DOCUMENTS

| Re. 29,082 | 12/1976 | Schwarz | 250/342 |
|---|---|---|---|
| 3,958,118 | 5/1976 | Schwarz | 250/209 |
| 4,258,255 | 3/1981 | Guscott | 250/342 |
| 4,342,987 | 8/1982 | Rossin | 250/353 |
| 4,377,808 | 3/1983 | Kao | 340/565 |

FOREIGN PATENT DOCUMENTS 1551541 8/1979 United Kingdom ............... 250/342

Primary Examiner—Carolyn E. Fields
Attorney, Agent, or Firm—Martin A. Farber

[57] ABSTRACT

A passive infrared intrusion detector has:

a multi-faceted parabolic reflector for dividing a target controlled area into a plurality of optically divided detection zones, for collecting infrared rays emitted from an object within the controlled area;

a passive infrared intrusion sensor combined with the reflector to detect the collected infrared rays;

a first means for generating a pulse when an absolute value of an output of the passive intrusion sensor exceeds a reference value; and a second means for generating an alarm signal when predetermined pulses are received from the first means within a predetermined period.

A pulse width discriminator is used to eliminate narrow noise pulses.

9 Claims, 19 Drawing Figures

PASSIVE INFRARED INTRUSION DETECTION SYSTEM

BACKGROUND OF THE INVENTION

The present invention relates to an improvement in a passive infrared intrusion detector or detection system for measuring an infrared ray emitted from an object so as to detect the intrusion of an object into a controlled or monitored zone.

A conventional passive infrared intrusion detector detects changes in a level of infrared rays in a target supervising area by using a passive infrared sensor for sensing infrared energy emitted from an object, thereby detecting the intrusion of the object.

Figure 1:
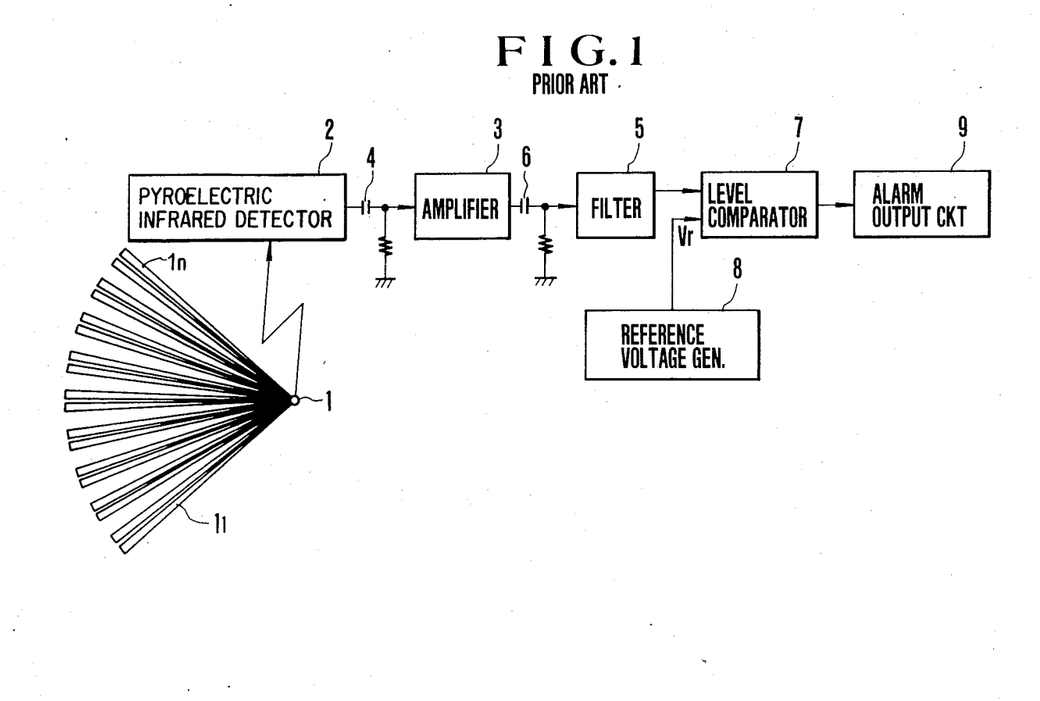
FIG. 1 is a block diagram of a conventional passive infrared intrusion detector.

FIG. 1 is a block diagram of a conventional passive infrared intrusion detector. Referring to FIG. 1, reference numeral 1 denotes a multi-faceted parabolic reflector. The reflector 1 provides optically divided detection zones $1_1$ to $1_n$. Reference numeral 2 denotes a pyroelectric infrared intrusion sensor or detector as a passive infrared sensor. The pyroelectric sensor 2 receives infrared rays focused by the multi-faceted parabolic reflector 1 from the detection zones and detects changes in the level of infrared rays. The pyroelectric sensor 2 generates an output signal corresponding to these changes. Reference numeral 3 denotes an amplifier for amplifying the output signal supplied from the pyroelectric sensor 2 through a coupling capacitor 4, so that an amplified signal is suitable for the following signal processing. Reference numeral 5 denotes a filter for extracting only a signal within the range of 0.1 to 10 Hz from the signal supplied from the amplifier 3 through a coupling capacitor 6. The signal range of 0.1 to 10 Hz corresponds to a moving speed of an object (e.g., man) within the zones $1_1$ to $1_n$. Reference numeral 7 denotes a level comparator for comparing an absolute value of the signal supplied from the filter 5 with a reference value Vr generated from a reference voltage generator 8. When the absolute value of the output signal from the filter 5 exceeds the reference value Vr, the level comparator 7 supplies an output to an alarm output circuit 9. The alarm output circuit 9 then generates an alarm signal.

In the passive infrared intrusion detector having the arrangement described above, when an intruder (i.e., object or man) crosses any one of the zones $1_1$ to $1_n$ of the multi-faceted parabolic reflector 1, this intruder serves as a chopper. More particularly, when the intruder enters any one of the zones $1_1$ to $1_n$, the infrared energy focused by the parabolic reflector 1 and sensed by the pyroelectric sensor 2 changes in level. A change in level of infrared energy is represented by a change in level of the output signal generated from the pyroelectric sensor 2. In this manner, the output signal from the pyroelectric sensor 2 is amplified by the amplifier 3, and the amplified signal is filtered through the filter 5. The filter 5 thus extracts a signal which falls within the frequency range of 0.1 to 10 Hz and which corresponds to a moving speed of the intruder. Noise signal components caused by movement of objects excluding the intruder can thus be eliminated. The absolute value of the output signal from the filter 5 is compared by the level comparator 7 with the reference value Vr generated from the reference voltage generator 8. When the absolute value of the output signal generated from the filter 5 exceeds the reference value Vr, the level comparator 7 generates a signal which represents the presence of an intruder. This signal is supplied to the alarm output circuit 9 which then generates the alarm signal.

However, in the conventional passive infrared intrusion detector having the arrangement and operation mode as described above, external noise and one-shot popcorn noise generated by the pyroelectric sensor may cause a malfunction and erroneously generate an alarm signal.

SUMMARY OF THE INVENTION

It is, therefore, an object of the present invention to provide a simple passive infrared intrusion detector capable of preventing an erroneous alarm.

In order to achieve the above object of the present invention, there is provided a passive infrared intrusion detector or detection system having a pulse discriminator for eliminating as noise components pulses which have narrower pulse widths than a predetermined pulse width, and a counter for causing an alarm output circuit to generate an alarm signal only when the number of pulses received by the counter exceeds a preset value.

DETAILED DESCRIPTION OF THE PREFERRED EMBODIMENTS

A passive infrared intrusion detector or detection system according to an embodiment of the present invention will be described in detail with reference to the accompanying drawings.

Figure 2:
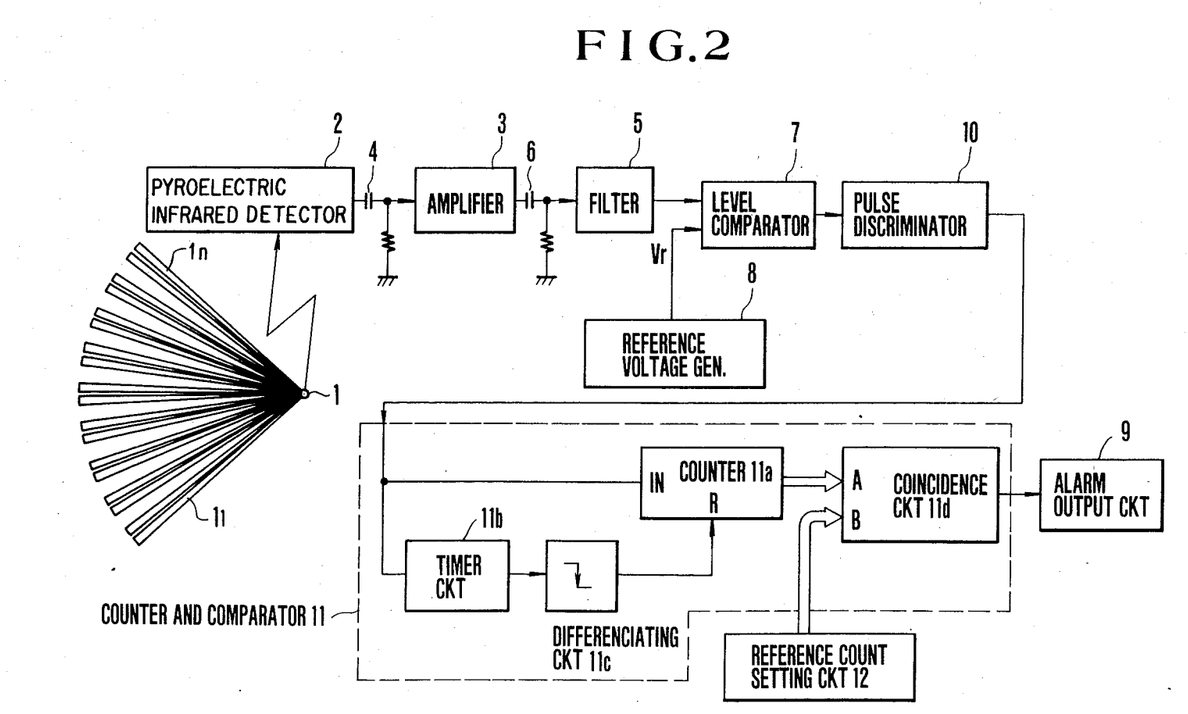
FIG. 2 is a block diagram of a passive infrared intrusion detector according to an embodiment of the present invention.

FIG. 2 is a block diagram of a passive infrared intrusion detector. The same reference numerals used in FIG. 1 denote the same parts in FIG. 2, and a detailed description thereof will be omitted.

Referring to FIG. 2, reference numeral 10 denotes a pulse discriminator for receiving an output signal from a level comparator 7 and discriminating whether or not the pulse width of the input signal exceeds a predetermined width. The pulse discriminator 10 only generates pulses each of which has a pulse width exceeding the predetermined width. Reference numeral 11 denotes a counter and comparator for counting the pulses generated from the pulse discriminator 10. The counter and comparator 11 is triggered in response to the first pulse generated from the pulse discriminator 10 and generates an output only when its count has reached a preset value K within a predetermined time interval. The preset value K is preset by a reference count setting circuit 12. An alarm output circuit 9 is driven in response to the output generated from the counter and comparator 11. The counter and comparator 11 comprises a counter 11a for counting output pulses from the pulse discriminator 10, a timer circuit 11b which is triggered in response to the output pulse from the pulse discriminator 10 and which generates a positive pulse having a predetermined time interval T, a differentiating circuit 11c for differentiating only the trailing edge of the output signal from the timer circuit 11b and supplying a differentiated output as a reset signal to the counter 11a, and a coincidence circuit 11d for comparing the count of the counter 11a and the preset value K from the reference count setting circuit 12 and generating an output when the count of the counter 11 coincides with the preset value K.

Figure 3A:
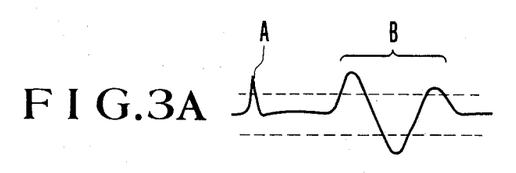
FIGS. 3A to 3C are respectively timing charts of signals produced by the main part of the passive infrared intrusion detector shown in FIG. 2.
Figure 3B:
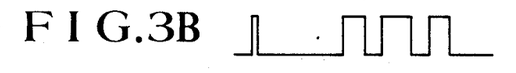
Figure 3C:
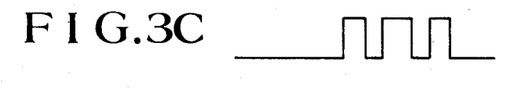

In the passive infrared intrusion detector having the arrangement described above, when a signal (FIG. 3A) including both popcorn noise A and an intrusion detection signal B is generated from a filter 5, the absolute value of this signal is compared by the level comparator 7 with that of a reference value Vr from a reference value generator 8. The level comparator 7 then generates a pulse signal, as shown in FIG. 3B. The output pulses from the level comparator 7 are subjected to pulse width discrimination by means of the pulse discriminator 10. Since the pulse discriminator 10 eliminates a pulse having a shorter width than the predetermined width, the pulse discriminator 10 generates a signal (FIG. 3C) from which the popcorn noise A is eliminated. The pulses generated from the discriminator 10 so as to correspond to the intrusion detection signal B respectively have a wider pulse width than that of the pulse corresponding to the popcorn noise A. Therefore, the signal from the pulse discriminator 10 has only those pulses which represent the intrusion detection signal, as shown in FIG. 3C.

Figure 4A:
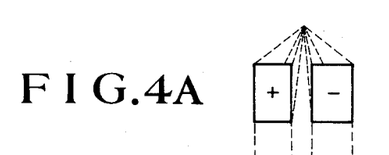
FIG. 4A is a schematic diagram for explaining the detection zones when a pyroelectric sensor comprises a dual element sensor.
Figure 4B:
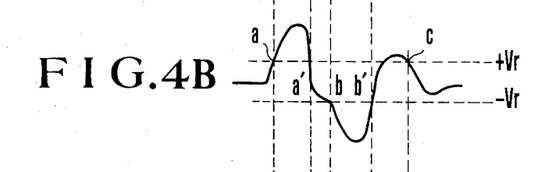
FIGS. 4B and 4C are respectively timing charts of signals generated from the main part of the passive infrared intrusion detector shown in FIG. 2 when the pyroelectric sensor comprises the dual element sensor.
Figure 4C:
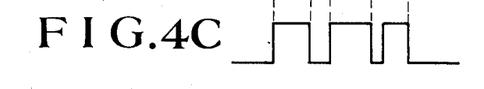

The counter 11a in the counter and comparator 11 sequentially counts the pulses generated from the pulse discriminator 10. The count of the counter 11a is compared by the coincidence circuit 11d with the preset value K generated from the reference count setting circuit 12. When a coincidence between the count of the counter 11a and the preset value K is detected, the coincidence circuit 11d supplies the output signal to the alarm output circuit 9. For example, when the preset value K is set to be "3", the counter 11a generates a count signal when its count has reached "3". However, the count time of the counter 11a is not infinite but is preset by the timer circuit 11b to be within a predetermined time interval T. More particularly, when the first input pulse is received from the pulse discriminator 10, the timer circuit 11b is triggered to generate a positive output during the predetermined time interval T. Only the trailing edge of the output signal from the timer circuit 11b is differentiated by the differentiating circuit 11c. The differentiated signal from the differentiating circuit 11c is supplied as the reset signal to the counter 11a, so that the count of the counter 11a is reset to zero. In this manner, the count time of the counter 11a is controlled by the preset time of the timer circuit 11b. The count signal is generated from the counter 11a only when the count thereof has reached "3" within the predetermined time T. The infrared rays from the zones $1_1$ to $1_n$ divided by a multi-faceted parabolic reflector 1 are detected by a pyroelectric sensor 2. When the pyroelectric sensor 2 comprises, for example, a dual element sensor, the sensor 2 is equivalent to a pair of detection zones having positive (+) and negative (−) polarities, as shown in FIG. 4A. Therefore, when the intruder crosses these detection zones, the level of the output signal from the pyroelectric sensor 2 changes at time a when the intruder enters the positive zone, time a' when the intruder leaves the positive zone, time b when the intruder enters the negative zone, time b' when the intruder leaves the negative zone, and time c when a predetermined time has elapsed after the intruder leaves the negative zone, as shown in FIG. 4B. It should be noted that a change in output from the pyroelectric sensor 2 between the time interval between the time b' when the intruder leaves the negative zone and the time c when the predetermined time has elapsed after the intruder leaves the negative zone is caused by a transient change when the crystal lattice distortion restores the equilibrium state. The output signal from the pyroelectric sensor 2 is amplified by an amplifier 3, and an amplified signal is supplied to the level comparator 7 through the noise filter 5. The absolute value of the filtered signal is compared with the reference value Vr by the level comparator 7. Three transition intervals of the signal generated from the filter 5 are waveform-shaped by the level comparator 7 to the three pulses shown in FIG. 4C, respectively. Therefore, every time the intruder crosses a pair of detection zones, three pulses are generated from the level comparator 7.

Figure 5:
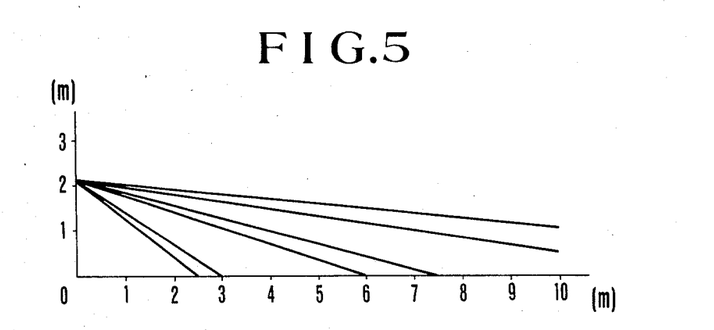
FIG. 5 is a graph showing the vertical controlled area.

Each detection zone has a plurality of levels (three in this embodiment) divided by the parabolic reflector 1 in the vertical direction, as shown in FIG. 5. Therefore, every time the intruder crosses the detection zones, the level comparator 7 generates several to several tens of pulses. The output signal from the level comparator 7 is supplied to the pulse discriminator 10, and the pulse discriminator 10 eliminates noise components of this signal which have narrow pulse widths, as previously described. The pulse train of the noise free signal is supplied to the counter and comparator 11. The counter 11a in the counter and comparator 11 counts the pulses within the predetermined or unit time interval T preset by the timer circuit 11b.

Figures 6A, 6B, 6C:
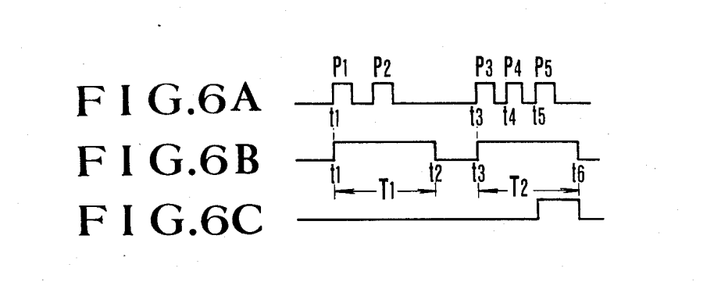
FIGS. 6A to 6C are respectively timing charts for explaining the operation of a timer circuit in the passive infrared intrusion detector shown in FIG. 2.

Assume that an input signal (FIG. 6A) having a pulse train is supplied to the counter and comparator 11. The timer circuit 11b is set at time t1 corresponding to the leading edge of a first input pulse P1 so as to start counting the time interval T. During a time interval T1 from time t1 to time t2, an output signal of "H" level is generated from the timer circuit 11b, as shown in FIG. 6B. When the output signal from the timer circuit 11b goes to "L" level at time t2, the differentiated output is generated by the differentiating circuit 11c, so that the counter 11a is reset.

In this manner, the counter 11a is enabled only while the output signal from the timer circuit 11b is set at "H" level. During the time interval T1, only two pulses P1 and P2 are received by the counter and comparator 11.

The count of the timer is incremented to "2" which is smaller than the preset value K (=3). Therefore, the counter and comparator 11 does not generate the output signal, as shown in FIG. 6C. It should be noted that the count "2" is reset to prepare for the subsequent counting operation simultaneously when the output from the timer is inverted to "L" level at time t2. However, when three pulses P3, P4 and P5 are received by the counter and comparator 11 at times t3, t4 and t5 during a time interval T2, the timer circuit 11b is triggered at time t3 and its output goes high. The timer counts the three pulses P3, P4 and P5 while it is kept high. The count of the counter 11a reaches "3" corresponding to the preset value K (=3), so that the counter and comparator 11 generates a signal, as shown in FIG. 6C. In this manner, when the counter and comparator 11 generates the output signal, the alarm output circuit 9 generates the alarm signal in response to the signal generated from the counter and comparator 11.

Figure 7:
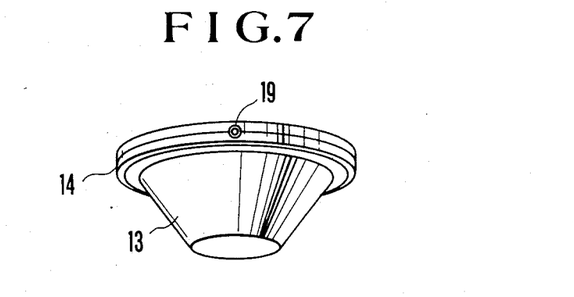
FIG. 7 is a perspective view showing the outer appearance of the passive infrared intrusion detector shown in FIG. 2.

As is apparent from the above description, since the noise components having a shorter pulse width than the predetermined width can be eliminated by the pulse discriminator 10, the passive infrared intrusion detector of this embodiment can be free from malfunction caused by external and popcorn noise components. In addition, the count of the counter and comparator 11 has a lower limit within the unit time interval, so that erroneous alarm generation can be decreased by setting the lower limit in accordance with a state of the controlled area. The passive infrared intrusion detector in this embodiment is mounted in a case 14 with a cover 13. This case 14 is mounted on, for example, a ceiling such that the cover 13 opposes the floor.

The cover 13 is made of a high-density polyethylene material to minimize influences on infrared ray detection. The cover 13 does not have a semispherical shape but a frustoconical shape so as to prevent the scattering of infrared rays emitted from the object within the controlled zones. The detection efficiency of the frustoconical cover is greater than that of the semispherical cover.

Figure 8:
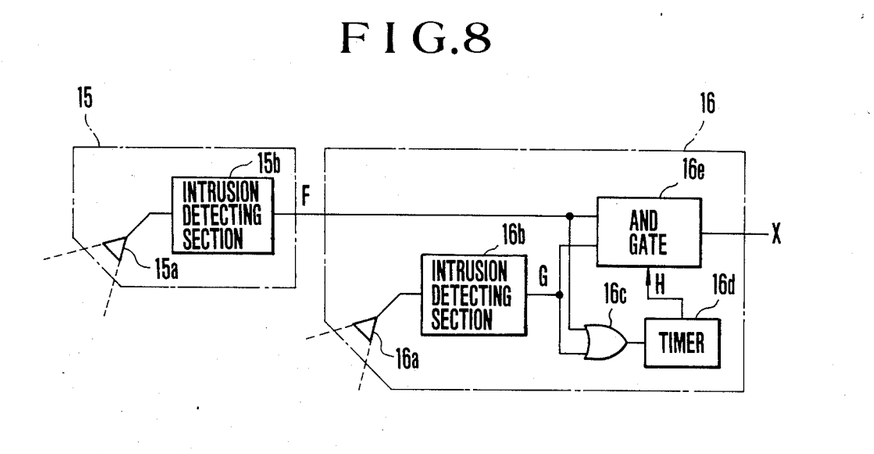
FIG. 8 is a block diagram of a passive infrared intrusion detector according to another embodiment of the present invention.

FIG. 8 is a block diagram of a passive infrared intrusion detector according to another embodiment of the present invention. In this embodiment, two intrusion detectors are used to further decrease erroneous alarm generation. When a security alarm system is designed, various types of alarm sensors are selected in accordance with the security environment, intrusion tricks and the like. For example, an ultrasonic alarm sensor is employed for a sealed room. When an intruder is expected to break a glass window to enter into a room, a glass sensor or the like is used. These sensors are connected in series with each other, and an OR output of outputs generated from the sensors is generally obtained. However, when any one of the sensors is erroneously activated, an erroneous alarm signal is generated from the system. The passive infrared intrusion detector shown in FIG. 8 is proposed to prevent the above malfunction. This embodiment will be described with reference to FIG. 8 and FIGS. 9A to 9D.

Referring to FIG. 8, reference numeral 15 denotes an ultrasonic intrusion detector; and 16, a passive infrared intrusion detector, as shown in FIG. 2. The ultrasonic intrusion detector 15 cooperates with the passive infrared intrusion detector 16 to perform a double check of the controlled area. The intrusion detector 15 comprises a ultrasonic transmitter/receiver 15a and a known intrusion detecting section 15b for generating an oscillation output to the ultrasonic transmitter/receiver 15a and for detecting the presence of an intruder in accordance with the time relationship between the transmitted signal and the received signal when the normal state changes to an abnormal state (in general, a time interval between the transmission time and the reception time becomes shorter than a predetermined time interval in an abnormal state).

On the other hand, the passive infrared intrusion detector 16 comprises: a pyroelectric infrared sensor 16a; an intrusion detecting section 16b for detecting the presence of the intruder in accordance with a change in output generated from the pyroelectric sensor 16a and for generating an alarm signal; an OR gate 16c for generated an output in response to one or both of an alarm signal F generated from the intrusion detecting section 15b in the ultrasonic intrusion detector 15 and an alarm signal G generated from the intrusion detecting section 16b; a timer 16d which can be triggered in response to the output signal generated from the OR gate 16c so as to count the pulses during a predetermined time interval TX, thereby generating an output signal H only during the predetermined time interval TX; and an AND gate 16e for generating a main alarm signal X in response to the alarm signals F and G (signals F and G need not have the same pulse duration but must both be detected within a single "H" level interval of the output signal H) while the output signal H is generated from the timer 16d.

Figure 9A:
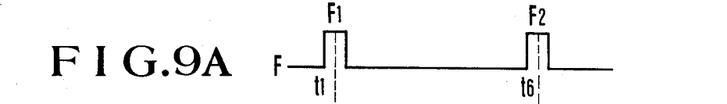
FIGS. 9A to 9D are respectively timing charts for explaining the operation of the passive infrared intrusion detector shown in FIG. 8.
Figures 9B, 9C, 9D:
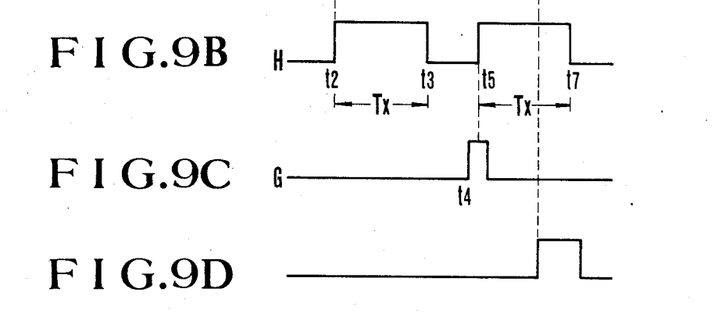

In the security alarm system having the configuration described above, an alarm signal F1 is generated from the intrusion detecting section 15b at time t1, as shown in FIG. 9A, and is supplied to the timer 16d through the OR gate 16c, so that the timer 16d is triggered. When the timer 16d is triggered, the output signal H thereof goes high ("H") at time t2 and goes low at time t3 after the time interval TX, as shown in FIG. 9B. However, in the case shown in FIG. 9C, the alarm signal G is not generated from the intrusion detecting section 16b within the time interval in which the output signal from the timer 16d is kept high. Therefore, the AND gate 16e detects that the alarm signal F1 is an erroneous alarm signal and does not generate the main alarm signal X. In this case, the "H" time interval TX of the output signal generated from the timer circuit 11b has a minimum length of time for counting the preset value K (in this case "3") corresponding to a lowest speed of the intruder crossing the detection zone and a maximum length of time for disabling the count to reach the preset value K only by the noise components.

Subsequently, as shown in FIG. 9C, when the alarm signal G is generated at time t4, the timer 16d is triggered in the same manner as described above, so that the output signal H goes high at time t5, as shown in FIG. 9B. The output signal H of high level from the timer 16d goes low from time t5 to time t7, that is during the second time interval TX. When the alarm signal F2 is generated during an interval time t5 to time t7, as shown in FIG. 9A, the AND gate 16e generates the main alarm signal X since the AND gate 16e detects that the alarm signals F and G are both generated within the predetermined second time interval TX, as shown in FIG. 9D. In this manner, the system is operated only when the alarm signals from the respective detecting sections are generated within the predetermined time interval, so that the probability of erroneous alarm signal generation is greatly decreased.

In this case, the alarm signals F and G need not be simultaneously generated and can be separately generated within the time interval TX. This is because timing errors of detection signals due to differences in detection operations or a deviation in detection zone between different types of detecting devices are considered.

In the above embodiment, two different types of intrusion detectors are combined. However, a plurality of passive infrared intrusion detectors can also be used to constitute a security alarm system. Furthermore, a plurality of intrusion detectors need not be used for the double check.

It should be noted that reference numeral 19 in FIG. 7 denotes a light-emitting diode which turns on when the alarm signal is generated at the time of installation of the system and a system test, and the diode is normally kept off by the internal switch.

Figure 10:
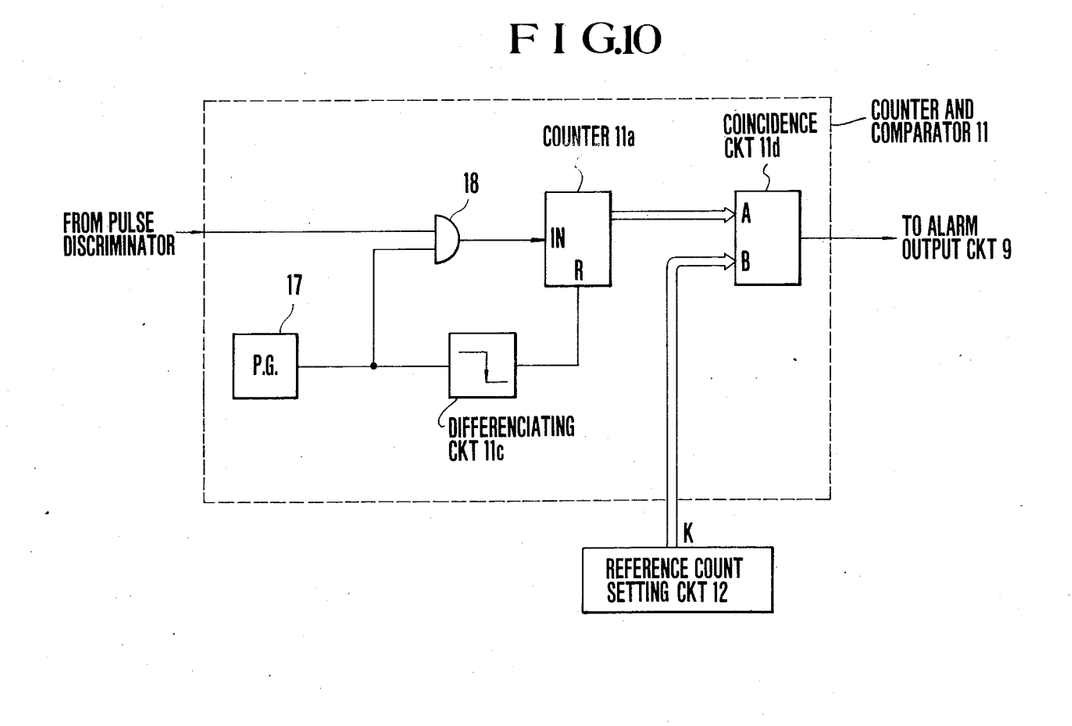
FIG. 10 is a block diagram showing another arrangement of the counter and comparator of FIG. 2.

FIG. 10 is a block diagram showing another arrangement of the counter and comparator 11 of FIG. 2. The same reference numerals used in FIG. 10 denote the same parts in FIG. 2. Referring to FIG. 10, reference numeral 17 denotes a pulse generator for generating a pulse signal having a predetermined period. An output signal from the pulse generator 17 is supplied to a differentiating circuit 11c. Reference numeral 18 denotes an AND gate for supplying a signal to a counter 11a when the pulse signal from the pulse generator 17 coincides with the output from the pulse discriminator 10.

In the circuit arranged above, the pulse signal from the pulse discriminator 10 is gated through the AND gate 18 and is supplied to the counter 11a only when the output signal from the pulse generator 17 is set at level "H". When the output signal from the pulse generator 17 goes low, the differentiated signal is generated by the differentiating circuit 11c, so that the counter 11a is reset and ready for the next counting cycle. In this case, the count of the counter 11a is compared by a coincidence circuit 11d with the preset value K generated from the reference count setting circuit 12. The alarm signal is generated only when the count of the counter 11a coincides with the preset value K.

In the passive infrared intrusion detector according to the present invention as described above, the output from the pyroelectric sensor is shaped into a pulse train. The pulses having smaller widths than the predetermined width are eliminated as noise components. Therefore, the external noise and the popcorn noise generated by the pyroelectric sensor can be eliminated. In addition, the alarm signal is generated only when the count of pulses generated within the predetermined time interval exceeds a preset value. Therefore, probability of the erroneous alarm generation can be greatly decreased.

What is claimed is:

1. A passive infrared intrusion detection system comprising:
   a multi-faceted parabolic reflector which views a target monitored area as a plurality of optically divided detection zones, said reflector collecting infrared rays emitted from an object within the monitored area;
   a passive infrared intrusion detector means combined with said reflector for detecting the collected infrared rays;
   comparison means for comparing values of signals outputted by said intrusion detector means with a reference value;
   pulse discriminator means connected to said comparison means for passing only pulses of said comparison means having a pulse width exceeding a predetermined pulse width so as to eliminate narrow noise pulses; and
   an alarm generating means including a counter for counting pulses outputted by said pulse discriminator means, and coincidence circuit means for generating an alarm signal only when the number of pulses received by said counter in a predetermined time interval exceeds a preset value.

2. A detection system according to claim 1, wherein said preset value is variable.

3. A detection system according to claim 2, wherein said preset value is a value more than 3.

4. A passive infrared intrusion detection system comprising:
   a multi-faceted parabolic reflector which views a target monitored area as a plurality of optically divided detection zones, said reflector collecting infrared rays emitted from an object within the monitored area;
   a passive infrared intrusion detector means combined with said reflector for detecting the collected infrared rays;
   first means for generating a pulse when a value of an output of said detector means exceeds a reference value;
   second means for generating an alarm signal in response to a predetermined number of pulses from said first generating means within a predetermined pierod; and
   a pulse discriminator interconnecting said first generating means with said second generating means for eliminating a noise pulse from pulses outputted from said first generating means, said noise pulse having a narrower pulse width than a predetermined pulse width, and wherein an output of said pulse discriminator is supplied to said second generating means.

5. A detection system according to claim 1, which further comprises another reflector, another passive infrared intrusion detector means coupled to said another reflector, and an AND gate responsive to outputs of said two detector means for outputting an alarm signal in response to alarms signalled by both of said detector means.

6. A detection system according to claim 1, which further comprises
   a cover made of a high-density polyethylene material.

7. A detection system according to claim 6, wherein said cover has a frustoconical shape.

8. A detection system according to claim 1, which further comprises
   another intrusion detector means, an AND gate responsive to output signals of said two detector means for generating a main alarm signal, and a control means for enabling said AND gate to generate said main alarm signal only when one of said detector means generates a first signal and then the other of said detector means generates a second signal within a predetermined period after generation of said first signal.

9. A passive infrared intrusion detection system comprising:
   a multi-faceted parabolic reflector which views a target monitored area as a plurality of optically divided detection zones, said reflector collecting infrared rays emitted from an object within the monitored area;

passive infrared intrusion detector means combined with said reflector for detecting the collected infrared rays;

first means for generating a pulse when a duration of an output of said detector means exceeds a predetermined pulse width so as to eliminate noise pulses; and second means for generating an alarm signal in response to a predetermined number of pulses from said first generating means within a predetermined period; said second generating means comprising:

counter means coupled to said first generating means for counting pulses outputted by said first generating means; and coincidence circuit means coupled to said counter means for generating an output as said alarm signal when a number of pulses from said first generating means exceeds a predetermined reference value.

* * * * *